United States Patent Office 3,211,566
Patented Oct. 12, 1965

3,211,566
ALCOHOL MODIFIED MAGNESIAS
Richard A. Patton, Arlington Heights, Ill., assignor to Morton Salt Company, Chicago, Ill., a corporation of Delaware
No Drawing. Filed Apr. 10, 1962, Ser. No. 186,366
11 Claims. (Cl. 106—308)

This invention relates to novel magnesium oxide compositions and more specifically to organically modified magnesias, and to methods of producing the same.

The compositions of the present invention have utility as reinforcing fillers for elastomeric products particularly synthetic elastomers, such as neoprene and the like; as stabilizing fillers for vinyl halide polymeric and copolymeric resinous materials; and as a readily dispersible hydrocarbon turbine fuel additive which reduces corrosion of the alloy parts by combination with vanadic oxide formed from the fuel combustion to form fusible vanadian compounds. The products of this invention are more compatible with organic, elastomeric and petroleum compositons than unmodified magnesia.

Magnesium oxide, or more conventionally magnesia, is a well known commodity of commerce. Magnesia may be prepared from a number of natural minerals. Magnesite (magnesium carbonate) may be calcined directly to magnesia. When this is done, a high density magnesium oxide of coarse particle size results. Brucite, naturally occurring magnesium hydroxide, may also be calcined directly to magnesium oxide. Once again high density, coarse particle magnesium oxide results. Dolomite, because of the presence of calcium oxide, requires treatment to separate the alkaline oxides after calcining. this may be done by treatment of the quicklime with carbon dioxide to solubilize the magnesium component as the bicarbonate. Filtration and washing will then produce a liquor which may, by heat, be decomposed to a basic carbonate. The basic carbonate may then be calcined to magnesium oxide. This is the process that has been employed to produce insulating magnesia.

The production of magnesium oxide made from sea water or brine involves the lime treatment of the magnesium-containing solution. A high calcium lime will precipitate magnesium hydroxide producing a soluble salt of the calcium in the process. The calcium oxide component of the dolomite will react with soluble magnesium chloride to produce insoluble magnesium hydroxide and soluble calcium chloride. While it is possible to produce a high surface area of magnesia from naturally occurring materials, the highest surface areas and the most reactive magnesias are produced by calcination of precipitated fine particle materials. These may be either magnesium carbonate or magnesium hydroxide. For purposes of this invention, any active magnesia, regardless of origin, is a suitable raw material. It is preferred, however, to employ the finer particle size precipitated materials.

If the calcination step is carried out at more moderate temperatures, the product produced is less crystalline and more amorphous in character than periclase. This magnesia may be used in a variety of industrial applications, such as a curing aid for elastomers, the manufacture of cements, metal coatings and other well known uses. The product may be characterized as a lightly calcined magnesia.

It has been found that many of the lightly calcined magnesias of commerce have unusual properties which are not common to the hard calcined periclase or the starting materials from which magnesias are prepared, namely the hydroxide or the carbonate. One characteristic of these lightly calcined magnesias is the ability to adsorb iodine. It has been found that magnesias having an iodine adsorption value of from 10 to about 300 milligrams per gram are capable of reacting with certain broad classes of organic compounds to produce an organically modified magnesia. The reactivity of these magnesias is highly unexpected in view of the fact that the starting material, such as magnesium hydroxide, is unreactive with respect to these organic compounds. Magnesias having iodine adsorption values below 10, such as periclase, are unreactive.

Inasmuch as magnesia is often used in conjunction with organic or hydrocarbon derived materials, it would be desirable, if a product could be produced which would modify the purely inorganic characteristics of magnesia, to produce a material which is more compatible with organic compositions.

Accordingly, in one broad form, the compositions of the present invention are prepared by reacting a lightly calcined magnesium oxide having an iodine adsorption number of from about 10 to about 300 with an alcohol containing up to 18 carbon atoms.

The magnesia starting material is a commercially available product which is sold under a variety of trade names. Magnesium carbonate derived magnesias are available commercially under the designation Magnesium Oxide 57 series A through G. The magnesium hydroxide derived magnesias are sold under the trade name Elastomag.

As indicated in the foregoing, the magnesia starting materials of the present invention have an iodine adsorption number or value of from about 10 to about 300 milligrams of iodine per gram of dry magnesium oxide, and in the most preferred instance an iodine number of from about 15 to about 220. The iodine number as referred to herein is determined by the following procedure.

METHOD OF IODINE NUMBER DETERMINATION (1) Weigh a 2 gram sample of magnesium oxide to the nearest milligram.

(2) Transfer to a clear, dry, 200-ml. glass-stoppered bottle.

(3) Add 100 ±0.2 ml. of 0.100 N iodine in carbon tetrachloride, free from traces of sulfur or carbon disulfide.

(4) Stopper the bottle and shake vigorously at ambient temperature in a suitable shaking device for 30 minutes (the test is relatively insensitive to temperature so that no temperature controls are employed).

(5) Allow to settle for 5 minutes and then pipette a 20 ml. aliquot of the clear solution into a 250 ml. Erlenmeyer flask containing 50 ml. of 0.03 N potassium iodide in 75 percent ethanol.

(6) Titrate the 20 ml. aliquot with standard 0.05 N sodium thiosulfate. The sodium thiosulfate should be standardized at least once every two weeks against a standard potassium iodate solution. A sharp end point is obtained without the use of starch indicator.

(7) Calculate iodine number in terms of milligrams of iodine per gram of sample according to the following equation:

$$(V_2 - V_1)\frac{127 \times N1}{0.4} = \text{mg. l/g.} = \text{iodine number}$$

where $V_2$ is the volume of thiosulfate equivalent to 20 ml. of the original iodine solution—before adsorption of iodine by the oxide; where $V_1$ is the volume of thiosulfate required by the 20 ml. aliquot after the adsorption; and $N_1$ is the normality of the thiosulfate solution.

The alcohol reactant is an organic aliphatic or alicyclic alcohol including substituted organic alcohols, preferably selected from the group consisting of alkyl monohydric alcohols containing from 4 to 18 carbon atoms, polyhydroxyl alcohols containing from 2 to 18 carbon atoms, alkoxy alcohols containing from 4 to 18 carbon atoms, alkenyl alcohols containing from 3 to 18 carbon atoms, cycloalkyl alcohols containing from 5 to 10 carbon atoms, aralkyl alcohols containing from 7 to 10 carbon atoms, amino alcohols containing from 2 to 18 carbon atoms and halo-alcohols containing from 3 to 18 carbon atoms.

Exemplary of the alkyl alcohols are normal, secondary and tertiary butyl alcohol, hexyl alcohol, stearyl alcohol, dodecyl alcohol and the like. Cycloalkyl alcohols may be exemplified by cyclopentanol, cyclohexanol, methyl cyclohexanol and the like. Alkenyl alcohols, such as allyl alcohol, hexenyl alcohol and the like are contemplated.

Aralkyl alcohols may be exemplified by benzyl alcohol, phenethyl alcohol, and p-methylbenzyl alcohol. Halo alcohols, such as fluoropropanol, fluoropentanol and fluoro undecanol are also useful as starting materials. Polyfunctional or polyhydroxy alcohols are illustrated by compounds, such as ethylene glycol, propylene glycol, glycerol, sorbitol and polyethylene glycol. Alkoxy alcohols, such as 2-ethoxy ethanol and the like, are also useful.

The products of the present invention may be prepared as indicated above by contacting a lightly calcined magnesia, as defined above, with an organic alcohol. Generally the reaction takes place at temperatures of from about zero to about 225° C., but is preferably carried out at temperatures of from about 65° C. to about 170° C. If desired, the process may be carried out in conjunction with an inert solvent, such as benzene, heptane, toluene, octane, xylene, carbon tetrachloride, or the like. Refluxing is one convenient method of carrying out the reaction.

It is preferred to use an excess of alcohol during the reaction and a molar excess of at least 10 percent is preferred. It should be understood that larger amounts of alcohol may be used in the process of the invention and the excess unreacted product is recovered after the reaction is complete.

The reaction time is not critical and times of from about ½ hour to 80 hours may be used depending upon the mode of reaction. In those instances where the alcohol and magnesia are reacted in a fluid or solvent medium, the completion of the reaction may be approximated by the cessation of water evolution. Water is ordinarily produced as a by-product in this reaction on a mole for mole basis with the amount of alcohol which has reacted (assuming a monohydroxy alcohol). The water produced may be collected and measured in a Dean-Stark trap or similar device. In this connection it is preferred to use solvents which azeotrope with water formed in the reaction and operate under reflux conditions. The reaction is usually complete in the "wet batch" process in from about 0.5 to about 3 hours.

The extent of reaction may also be benefited by passing the reaction mixture through a colloid mill or homogenizer to increase the surface available for reaction.

When the reaction is complete, as may be determined by the cessation of the evolution of water, the reaction product is recovered by filtration and washed with a volatile solvent to remove any excess organic reactant. Solvents for washing may be any inert material substantially of the same type as are used for the reaction medium. After washing, the filter cake is dried, preferably at temperatures of from between about 65 and 100° C. and pulverized into a powder.

The products of the present invention may also be prepared by means of a fluidized bed technique wherein a pulverized lightly calcined magnesium oxide reactant is placed in a fluidized bed apparatus and a vaporized organic alcohol reactant carried into and through the fluidized bed by the fluidizing gas stream. Excess organic vapors may be stripped from the fluidized magnesium oxide in the same or a second compartment. In utilizing this technique the magnesium oxide does not need to be separated from solvent, washed or dried, as in the case of the "wet batch" technique. Generally the same temperatures are useful in fluidized bed technique as in the solvent system or "wet batch" technique. The temperature employed will usually depend upon the boiling point of the alcohol reactant or its partial pressure in the fluidizing gas system. Generally the time of the contact at these temperatures is from about ½ to as long as 80 hours. The following specific examples will further illustrate the process for producing the compositions of the present invention.

*Example 1*

Into a 3-liter 3-necked flask, equipped with a thermometer, stirrer and reflux condenser with attached Dean-Stark trap, were placed 1.5 liters of dry benzene solvent and 26.9 grams of dry, technical grade lauryl alcohol. (While the reactants utilized were in this instance dried by means of anhydrous calcium sulfate or other similar drying agents, it is also possible to dry the reactants by refluxing to azeotropically distill any water present.)

The contents of the vessel were heated to about 60° to 65° C., and 230 grams of magnesium oxide added with stirring. The reaction mixture was then heated to reflux temperature, i.e. approximately 78° C. with stirring. The water of reaction was collected and measured in the Dean-Stark trap during the reaction period. The reaction was considered complete when water was no longer distilled off. The product was recovered by filtering the mixture through a Buchnel funnel with vacuum. The filter cake was washed with hot benzene before cracking occurred. The washed filter cake was allowed to air dry for a brief period and then dried in vacuo at 65° C. for from 8 to 10 hours. The magnesium oxide utilized had activities as shown in the following table. The lauryl alcohol utilized was a technical grade sold under the trade name Lorol-11; 70% n-dodecyl; 26% n-decyl alcohol; 4% related alcohols.

TABLE I

| Run | A | B | C |
|---|---|---|---|
| Magnesium oxide activity (mg. $I_2$/gm. MgO) | 40 | 100 | 140 |
| Grams of water recovered | 1.8 | 2.1 | 2.7 |
| Lauryl alcohol charged (gm.) | 26.9 | 26.9 | 26.9 |
| Reaction time (hrs.) | 1.5 | 1.25 | 1 |

The following examples will illustrate the production of similar products using various alcohols by the methods of the present invention.

TABLE II

| Ex. No. | Magnesium Oxide | | Organic Alcohol | Amount (grams) | H₂O Evolved, g. | Reaction Time, hr. | Reaction Temp., °C. | Solvent | Weight Percent Organic in Product |
|---|---|---|---|---|---|---|---|---|---|
| | Amount (grams) | Iodine Number [1] | | | | | | | |
| 2 | 230 | 100 | n-Amyl | 14.0 | 1.75 | 1.5 | 80 | Benzene | 4.0 |
| 3 | 230 | 100 | t-Amyl | 20.0 | 1.00 | 1.5 | 140 | Xylol | 2.5 |
| 4 | 100 | 100 | n-Butyl | 17.0 | 1.00 | 2.0 | 140 | ...do | 4.5 |
| 5 | 230 | 100 | Sec-butyl | 10.7 | 2.2 | 1.7 | 80 | Benzene | 4.5 |
| 6 | 230 | 100 | t-Butyl | 10.7 | 2.4 | 1.7 | 80 | ...do | 5.0 |
| 7 | 230 | 100 | Cyclohexyl | 14.5 | 2.0 | 1.1 | 80 | ...do | 4.5 |
| 8 | 230 | 100 | n-Decyl | 24.7 | 2.0 | 1.0 | 80 | ...do | 3.5 |
| 9 | 230 | 100 | 2-ethoxyethyl | 14.0 | 1.9 | 1.0 | 80 | ...do | 2.0 |
| 10 | 230 | 100 | Octyl | 20.3 | 1.5 | 1.1 | 80 | ...do | 3.5 |
| 11 | 230 | 100 | 2-aminoethyl | 10.0 | 2.9 | 1.5 | 80 | ...do | 2.0 |
| 12 | 230 | 100 | Fluoropropyl [2] | 16.0 | 2.0 | 2.0 | 140 | Xylol | 4.0 |
| 13 | 230 | 100 | Fluoroamyl [3] | 15.0 | 2.0 | 2.0 | 140 | ...do | 4.0 |
| 14 | 230 | 100 | Fluoroundecyl [4] | 63.8 | 2.0 | 2.0 | 80 | Benzene | 4.5 |
| 15 | 230 | 100 | 3,3,4,4,5,5,6,6-octafluoro-2-methyl-2-hexanol. | 37.6 | 2.4 | 2.0 | 80 | ...do | 4.5 |
| 16 | 230 | 100 | Benzyl | 17.0 | 2.0 | 1.5 | 80 | ...do | 4.8 |
| 17 | 230 | 100 | Lauryl | 29.6 | 2.5 | 1.75 | 140 | Xylol | 5.0 |

[1] In terms of mg. iodine absorbed per gram of magnesium oxide.
[2] 2,2,3,3-tetrafluoropropanol.
[3] 2,2,3,3,4,4,5,5-octafluoropentyl.
[4] $HCF_2\text{-}(CF_2)_9\text{-}CH_2OH$.

Example 18

As indicated above, the process of the present invention may also be carried out by fluidized bed techniques. In this particular example the apparatus utilized comprised a chamber for heating and vaporizing the alcohol reactant, means for conducting vapors from the heating chamber to a further conduit, and feeding the same into a gas stream, which stream of gas and vapor is introduced into the lower regions of the fluidized bed. Means are also provided for removing the vapors from the upper regions of the fluidized bed and conducting the same to a cooling trap to condense and recover the effluent vapors from the fluidizing gas. In this particular example a stream of technical lauryl alcohol vapors (boiling point about 255° C. at 760 mm.) is carried by means of a nitrogen gas stream flowing at a rate of about 2.5 liters per minute, which was subsequently passed through a fluidizing bed of 25 grams of granulated magnesium oxide (20 to 35 mesh) having an iodine number of 100. The entire system was operated at a pressure slightly below atmospheric pressure, namely, 570 mm. Hg (absolute). The temperature of the fluidized bed was raised gradually from about 80 to about 200° C. during the reaction period of 72 hours. The product contained 4.5% organic material.

Experiments following the procedures outlined for examples 1 through 17, using magnesium oxide having an iodine adsorption of about 170, resulted in a benzyl alcohol modified magnesia or adduct containing 5.33% organic, a decyl alcohol adduct containing 6.65% organic, and a pentaerythritol adduct having an organic content of 9.58%. Reaction with a magnesia of iodine number 100 produced a stearyl alcohol adduct containing 7.3% organic, a cetyl alcohol adduct containing 7.4% organic, and a tridecyl alcohol adduct containing 3.9% organic.

The variation in organic content possible may also be seen in the use of magnesium oxides of varying activity or iodine adsorption value with a single alcohol, as specifically disclosed in Example 1. The resulting organically modified magnesia contained from 4.0% organic in the case of the magnesium oxide of activity of 40, and up to 8.5% organic when reacted with a magnesium oxide of 170 activity.

The organically modified magnesias of this invention may be further characterized as containing from about 1 to 25 percent organic material, and preferably from about 2½ to 15 percent organic material. The organic modification of the purely inorganic character of magnesia results in a composition that is more compatible with hydrocarbon derived materials, and particularly suitable for use as a filler, reinforcing agent or the like in such organic compositions as fuel oils, lubricants, elastomers, polymers, plastics and similar materials.

As indicated in the foregoing, the products of the present invention are useful as organically modified fillers in rubber, vinyl, plastics and the like. For example, magnesium oxide, having an iodine number of 160, reacted with decyl alcohol and benzyl alcohol, produced products which could be dispersed in kerosene as fluid suspension at a solids or from 40 to 70% using only 1–2% aerosol O.T. The same magnesium oxide, without organic modification, was incapable of producing a similar dispersion.

As a further example, a decyl alcohol modified magnesium oxide was incorporated into a neoprene formulation compounded on a two-roll rubber mill. The formulation is as follows:

| | Parts (grams) |
|---|---|
| Neoprene GN | 100 |
| Neoprene A | 2 |
| Stearic acid | 1 |
| ZnO | 5 |
| MgO (see Compositions A and B) | 4 |

Compositions A and B, used in the above formulations, are respectively as follows:

(A)

Mixture of: Parts
- Magnesium oxide (iodine No. 170) _____ 230
- Decyl alcohol (0.1 mole) _____ 10.8

(B)

Reaction product of: Parts
- Magnesium oxide (iodine No. 170) _____ 230
- Decyl alcohol (0.1 mole) _____ 10.8

Mooney scorch time (ASTM Method D–927) is an estimate of the degree to which precure of an elastomer during compounding is inhibited by ingredients in the recipe. Mooney scorch time for the uncured stocks prepared from Compositions A and B as indicated above are as follows:

| Stock No.: | Mooney scorch time (minutes) |
|---|---|
| A | 29 |
| B | 36 |

From the foregoing it may be seen that the use of a more readily dispersed decylated magnesia results in a product which provides more process safety in a conventional neoprene formulation as compared to such a formulation using an unmodified conventional magnesium oxide. It was also observed during the compounding of these two neoprene stocks that about 20 to 25 percent less time was required to incorporate the more dispersible organically modified magnesia as compared to the unmodified magnesium oxide.

It has also been observed that organically modified magnesias are more dispersible in polymeric material, such as vinyl chloride, when compared with the unmodified magnesum oxide, used as a filler.

The following example is a further illustration of the beneficial effects obtained in the use of an organically modified magnesia in an elastomer stock.

Vulcanizing stocks having the following formulation were prepared:

|  | Parts by Weight ||
|---|---|---|
|  | Stock A | Stock B |
| Neoprene W | 100 | 100 |
| Neozone A | 2 | 2 |
| Stearic acid | ½ | ½ |
| SRF Black | 29 | 29 |
| Zinc oxide | 5 | 5 |
| Ethylene thiourea | ½ | ½ |
| Magnesia (commercially available under the trade name Elastomag 100) | 4 | [1] 4 |

[1] Laurylated adduct of magnesia containing 8.84% organic (from reaction of magnesia iodine No. 100 and Lorol 11).

Following cure at 307° F. for 10 minutes, tensile property evaluation of the products showed that stock A had a "tensile product" (tensile times elongation) of $1.73 \times 10^6$ while stock B had a tensile product of $2.5 \times 10^6$, a 45% increase.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A process for preparing an organically modified magnesia which comprises admixing in a solvent medium at a temperature between about 0° C. and 225° C. a lightly calcined magnesia having an iodine absorption number of from about 10 to about 300 with a compound selected from the group consisting of alkyl alcohols containing from 4 to 18 carbon atoms, alkenyl alcohols containing from 3 to 18 carbon atoms, cycloalkyl alcohols containing from 5 to 10 carbon atoms, aralkyl alcohols containing from 7 to 10 carbon atoms, halo alkyl alcohols containing from 3 to 18 carbon atoms, polyhydroxy alkyl alcohols containing from 4 to 18 carbon atoms, and amino alkyl alcohols containing from 2 to 18 carbon atoms, and recovering therefrom an organically modified magnesia containing from 1 to 20 percent organic matter, the organic matter being derived from said alcohol.

2. The product of the process of claim 1.

3. The process of claim 1 wherein the reaction is carried out under substantially anhydrous conditions.

4. The process of claim 1 wherein the magnesia has an iodine adsorption number of from about 15 to about 220.

5. The process of claim 1 wherein the alcohol is lauryl alcohol.

6. The process of claim 1 wherein the alcohol is stearyl.

7. The process of claim 1 wherein the alcohol is cetyl.

8. The process of claim 1 wherein the alcohol is butyl.

9. The process according to claim 1 wherein the contacting step is carried out at a temperature between about 65 and 175° C.

10. The process according to claim 1 carried out under reflux conditions using azeotropic distillation to remove the water of reaction.

11. A process for preparing an organically modified magnesia which comprises admixing in a fluidized bed at a temperature between about 0° C. and 225° C. a lightly calcined magnesia having an iodine absorption number of from about 10 to about 300 with a compound selected from the group consisting of alkyl alcohols containing from 4 to 18 carbon atoms, alkenyl alcohols containing from 3 to 18 carbon atoms, cycloalkyl alcohols containing from 5 to 10 carbon atoms, aralkyl alcohols containing from 7 to 10 carbon atoms, halo alkyl alcohols containing from 3 to 18 carbon atoms, polyhydroxy alkyl alcohols containing from 4 to 18 carbon atoms, and amino alkyl alcohols containing from 2 to 18 carbon atoms, and recovering therefrom an organically modified magnesia containing from 1 to 25 percent organic matter, the organic matter being derived from said alcohol.

References Cited by the Examiner

UNITED STATES PATENTS

| 2,739,075 | 3/56 | Iler | 106—308 |
| 2,973,282 | 2/61 | Gross | 106—288 |

TOBIAS E. LEVOW, *Primary Examiner.*

UNITED STATES PATENT OFFICE
CERTIFICATE OF CORRECTION

Patent No. 3,211,566                      October 12, 1965

Richard A. Patton

It is hereby certified that error appears in the above numbered patent requiring correction and that the said Letters Patent should read as corrected below.

Column 6, line 32, for "or" read -- of --; column 8, line 6, for "20" read -- 25 --.

Signed and sealed this 28th day of June 1966.

(SEAL)
Attest:

ERNEST W. SWIDER
Attesting Officer

EDWARD J. BRENNER
Commissioner of Patents